Jan. 17, 1967  J. KANTOR ET AL  3,298,634
BALLOON
Filed March 5, 1965  3 Sheets-Sheet 1
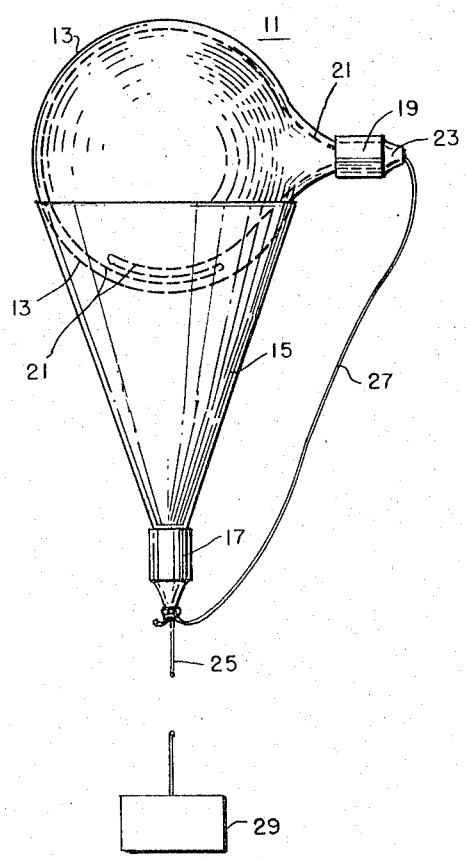
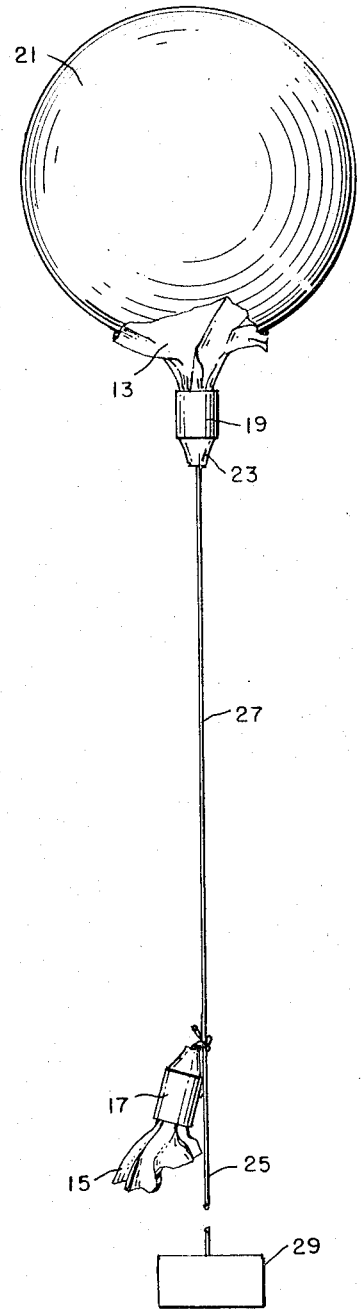
INVENTORS,
JOHN KANTOR
MOSES SHARENOW.
BY Harry M. Saragovitz,
Edward J. Kelly, Herbert Berl
& Julian C. Keppler
ATTORNEYS

INVENTORS,
JOHN KANTOR
MOSES SHARENOW

Jan. 17, 1967  J. KANTOR ETAL  3,298,634
BALLOON
Filed March 5, 1965  3 Sheets-Sheet 3

INVENTORS,
JOHN KANTOR
MOSES SHARENOW
BY *Harry M. Saragovitz*
*Edward J. Kelly, Herbert Berl*
*& Julian C. Keppler*  ATTORNEYS

United States Patent Office

3,298,634
Patented Jan. 17, 1967

3,298,634
BALLOON
John Kantor, Clifton, and Moses Sharenow, Asbury Park, N.J., assignors, by direct and mesne assignments, to the United States of America as represented by the Secretary of the Army
Filed Mar. 5, 1965, Ser. No. 437,614
2 Claims. (Cl. 244—31)

The invention described herein may be manufactured and used by or for the Government for governmental purposes without the payment to us of any royalty thereon.

The invention herein relates to high altitude balloons and relates more particularly to stratospheric balloons used in meteorological investigations.

Conventional type balloons have long been used for carrying aloft meteorological instruments such as, for example, instruments for continuously measuring atmospheric data, radio telemetering equipment for relaying data to ground stations and recording equipment for making a permanent record of the atmospheric data throughout the flight of the balloon. In its normal use the balloon is inflated with a lighter-than-air gas such as hydrogen or helium and launched, the unit slowly ascending while continuing its flight. As the atmosphere becomes rarer, the reduction in pressure causes the balloon to expand until eventually its elastic limit is reached and the balloon bursts. At this point, the parachute automatically takes charge and the instrument descends to the earth.

The desire to carry the equipment to higher altitudes more rapidly has imposed heavy demands upon balloon requirements, it becoming necessary that they be larger and sufficiently durable for long periods of operation. The requirement to rise to high altitudes has imposed limitations on the capabilities of the tracking equipment when standard rate of rise balloons are used. Accordingly the need arises for a balloon that can achieve a rapid ascent rate, i.e., about 1600–1700 feet per minute to an altitude in the neighborhood of 100,000 feet during both day and night. The last mentioned requirement, that is, the utilization of a balloon for night use has been difficult to obtain for the following reasons. Nighttime ascent rates are generally lower than daytime rates for the same volume of gas for all balloons. This is due to the fact that solar radiation in the daytime increases the free lift of a bolloon by creating a super heat within the balloon. The temperature of the gas inside can be as much as 40° C. warmer than the air outside the balloon. At night, on the other hand, the gas temperature is 5 to 10° C. cooler than the air temperature. The balloon at night therefore displaces a correspondingly smaller volume of air and has a lower free lift than does the balloon during the daytime at similar altitudes.

Attempts to provide a balloon design that will have the durable characteristics of rapid ascent and extremely high altitudes have not proved feasible. One proposed design of balloon suggested a balloon of extremely large size and gas capacity. However, such design was found to be impractical in view of the extreme difficulties encountered in initially launching such balloons. Also, the design of separate balloons adapted for either daytime or nighttime use proved economically unfeasible.

In the past several years there have been introduced, so called streamline balloons which are an assembly of a conventional spherical balloon to which has been appended a conical shape tail section. Such balloons are shown in the patents to Mastenbrook No. 2,790,479, and Sharenow No. 3,140,969. While such balloons have a high ascent rate it was found that the maximum ceiling of such balloons was in the neighborhood of 75,000 to 90,000 feet, and to such height only in daytime hours. In this same regard when spherical balloons are used, it was found that such balloons could achieve the maximum desired altitude, however, the rate of ascent falls far below the 1600–1700 feet per minute desired.

In view of the discussion above, a primary object of the present invention is to provide a novel balloon assembly capable of reaching altitudes in the neighborhood of 100,000 feet or better, having an ascent rate of at least 1700 feet per minute and capable of usage during daylight and nighttime hours.

Another object of the invention is to provide a balloon assembly capable of achieving the objective indicated above, which if attempted by other means, such as the utilization of an extremely large and fragile balloon would fail if conventional launching techniques were used to launch such a balloon.

The above objective and other features and advantages have been accomplished through the conception of a novel balloon array comprising, generally a "combination balloon" which includes an outer streamline balloon and an inner balloon of generally spherical shape confined in the spherical portion of said streamline balloon wherein the outer or shedding balloon is designed to burst at a predetermined height and fall away to allow the inner balloon free to rise to the desired maximum elevation, that is, about 100,000 feet.

The invention can be best understood from the following description, taken in connection with the accompanying drawings in which like reference characters refer to like parts in the figures. In the drawings FIG. 1 is a view of the "combined" balloon assembly at the time of its launching;

FIG. 2 is a view of the inner balloon, in flight, after shedding of the outer balloon;

Figure 3:
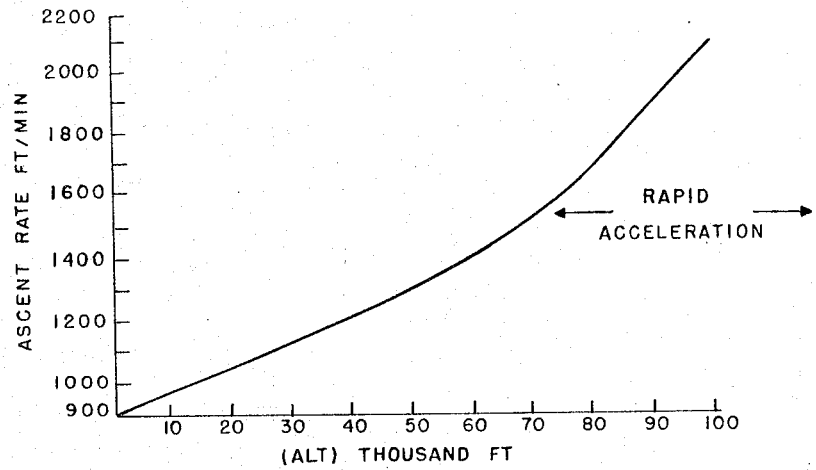
FIGS. 3–6 are graphs showing functional operating characteristics of various types of balloons discussed herein and further of the improved performance of the balloon assembly of this invention.

For a detailed description of a preferred embodiment of the invention reference is made to FIG. 1 which shows a combination balloon comprising in part an outer or shedding streamline balloon 11, which includes a main body portion 13 of spherical shape, a dependent conical tail 15 having a neck 17, and a second neck 19 forming part of the spherical body portion of balloon 13. Contained within the spherical portion 13 of the balloon 11 is a balloon 21 which is of conventional spherical shape and having a neck 23. The manner in which the balloon 21 is inserted within the spherical shaped body portion 13 is of no concern to the invention herein. If necessary, an appropriate jig may be used to expand the size of the neck 19 to permit ready insertion of the balloon 21 into the balloon 13. Any other technique may be utilized to accomplish the same desired end. During the earlier stages of inflation, gas pockets may develop which can pinch off sections of the inner balloon 21 and prevent full inflation of all parts of the balloon, thus causing either premature burst on the ground, irregular shapes or premature burst during flight. To overcome this possibility, we have found that the application of very fine lubricating talc between the balloons 13 and 21 eliminated such problem. The talc allows the balloons to glide readily against each other with very little possibility of constriction of the inner balloon 21. It is to be noted that the neck 23 of inner balloon 21 extends beyond the neck 19 of balloon 13 to permit the admission of the desired gas only into the inner balloon. Completing the assembly is a train line 25 secured to and extending from the neck 17 and a slack train line 27 secured at one end to the neck 23 of the balloon 21, and at its other end to the trail line 25 at a point close to the neck 17. Affixed to the free end of the line 25 is an instrument such as a radiosonde 29.

The physical make-up, specifically the size, weight, volume and composition of the discrete balloons in the combined balloon assembly plays an important part in the achievement of the objectives outlined above. For example, the bursting and shedding of the outer balloon is accomplished by having the balloon 11 made of a material that is characterized in having a predetermined ultimate bursting elongation factor lesser than that of the inner balloon 21. In one specific embodiment the streamline balloon 11 had an overall length of 145 inches, including the conical tail section 15, and wherein the spherical section has a length of 65 inches and the total weight of the balloon is 1800 grams. The inner balloon is also 145 inches long and weighs 2200 grams. The thickness of each of the balloons indicated is substantially as follows. Spherical portion 13, .008 inch, tail portion 15, .003 inch and inner balloon 21, .004 inch. The lengths of the separate balloons indicated above are the length of the balloons when completely deflated, and measured as on a table top with no stretch imparted to the balloon. It is to be noted that at the time of initial launching, the inner balloon 21 is contained entirely within the spherical portion 13 of the balloon 11 as shown in FIG. 1. The folds at the bottom of the outline of the inner balloon, as seen in FIG. 1, indicate that such balloon is larger than the outer balloon 13. To inflate the combined balloon for launching, the inner balloon 21 alone is inflated with the desired gas, and at the same time expanding the spherical portion 13. The combined balloon is now ready for launching.

Upon being launched the streamlined balloon 11 will have a high ascent rate in the lower altitude. Such streamline balloon will be carried rapidly to about 50,000 feet. At that altitude the balloon 11 will burst due to the physical make-up of the balloon as hereinbefore set forth. Such bursting of the outer balloon 11 will cause it to be shed from the inner spherical balloon, which now stripped of the dead weight has increased free lift and proceeds to accelerate at a rapid rate of ascent where normally a streamline balloon would decelerate.

In added explanation of the advantage of the invention herein, reference is made to FIGS. 3-6 of the drawings which show the performance characteristics of several types of balloons including those of the combined balloon herein described.

FIG. 3 points out the operating characteristics of a spherical balloon of the type described such as 21 rising by itself with the same amount of gas as the combined balloon. From the curve shown, it can be observed that such balloon has a relatively slow ascent rate up to about 65,000 feet. Thus for example, at altitudes up to 20,000 feet the ascent rate is about 1100 feet per minute. Between 30-40,000 feet altitude the rate is about 1200 feet per minute. Not until the balloon reaches an altitude of about 65,000 feet is there any marked increased rate of ascent, at which time the ascent rate rapidly accelerates to about 2100 feet per minute at the time of burst of the balloon at about 100,000 feet.

Figure 4:
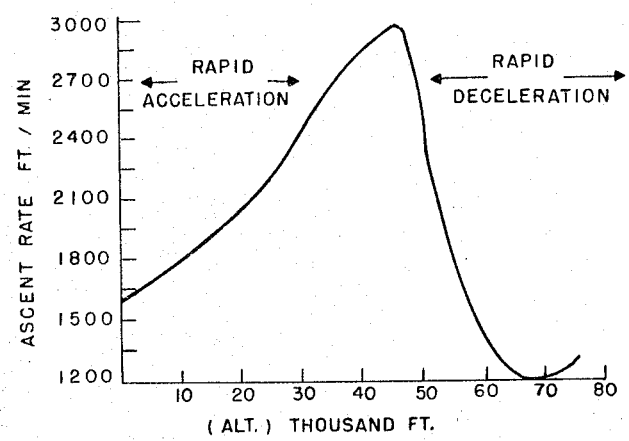

FIG. 4 shows the operational characteristics of a conventional streamline balloon of the kind described in the Mastenbrook patent. The curve indicates that such balloon has a fairly high rate of ascent, i.e., starting initially at about 1600 feet per minute and reaches an ascent rate of from 2700-3000 feet per minute at an altitude of about 50,000 feet. However, the ascent rate drops sharply in the next 10,000 feet as can be seen until the balloon bursts.

Figure 5:
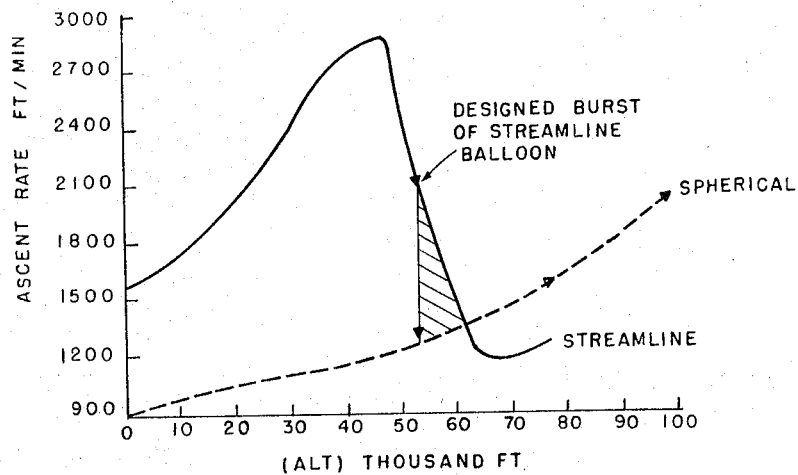

FIG. 5 is intended to show the ascent rates of both balloons superimposed upon each other.

Figure 6:
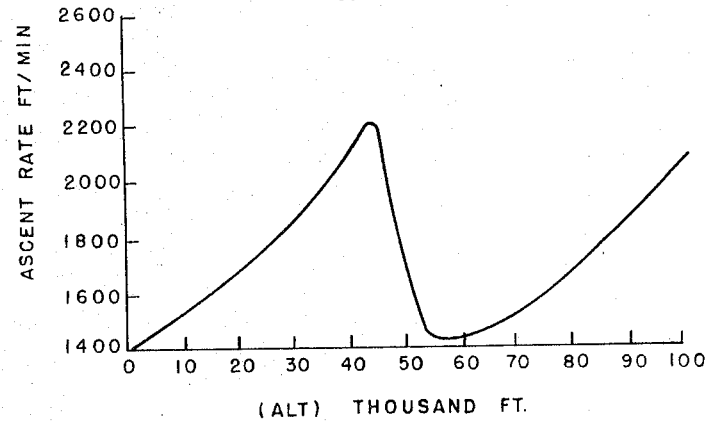

FIG. 6 shows the actual ascent rate of the combination balloon of this invention, both in its initial combination state and the ascent rate of the spherical balloon 21 after shedding of the outer balloon. From the curve it can be seen that such balloon starts at about 1400 feet per minute with rapid acceleration rate up to about 50,000 feet altitude. Its ascent rate is slightly lower than a streamline balloon alone since it carries the weight of the inner balloon. The outer balloon 11 will burst at 50,000 feet, since it was so designed, instead of continuing on to 75,000 feet, even though the streamline balloon might have a slight advantage over the spherical balloon between 50,000 and 60,000 (see shaded area of FIG. 5). At burst the outer balloon is shed and the inner spherical balloon has an ascent rate of about 1400 feet per minute, increasing in ascent rate until it reaches 70,000 feet then accelerates very rapidly to about 2100 feet per minute at an altitude of 100,000 feet and until burst.

Having described the invention, what is claimed as new is:

1. A high rise, rapid ascent balloon assembly comprising in combination a streamline balloon including a first spherical balloon having an appended conical tail section and a neck portion, and a second balloon of general spherical configuration entirely contained within said first spherical balloon except for the neck portion of said second balloon which extends outwardly of the neck portion of said first balloon to permit inflation of said second spherical balloon, and wherein said first spherical balloon and its appended tail section has an ultimate bursting elongation factor lesser than said second balloon whereby said first spherical balloon and its appended tail section will burst alone at a predetermined height to permit escape and the free rise of said second spherical balloon.

2. A high rise, rapid ascent balloon assembly comprising in combination, an outer streamline balloon including a first spherical balloon having an appended conical tail section and a neck portion wherein the physical properties of said outer balloon are

|  | Inches |
|---|---|
| Thickness of spherical balloon | .008 |
| Thickness of tail section | .003 |
| Length of spherical balloon (deflated) | 65 |
| Length of tail section (deflated) | 80 |

Total weight of spherical balloon and tail section 1800 grams and an inner balloon of general spherical configuration entirely contained within said first spherical ballon except for the neck portion of said inner balloon which extends outwardly of the neck portion of said first spherical balloon to permit inflation of said inner balloon and wherein the physical properties of said inner balloon are

| Thickness, inch | .004 |
|---|---|
| Length (deflated), inches | 145 |
| Weight, grams | 2200 |

References Cited by the Examiner

UNITED STATES PATENTS 2,844,366  7/1958  Mastenbrook _____ 244—31
3,184,742  5/1965  Cutler _____ 244—31 X MILTON BUCHLER, *Primary Examiner.*

FERGUS S. MIDDLETON, *Examiner.*

T. MAJOR, *Assistant Examiner.*